Aug. 15, 1967        T. R. CASSEL ET AL        3,336,056
                        CONDUIT SYSTEM
Filed March 25, 1965                      2 Sheets-Sheet 2
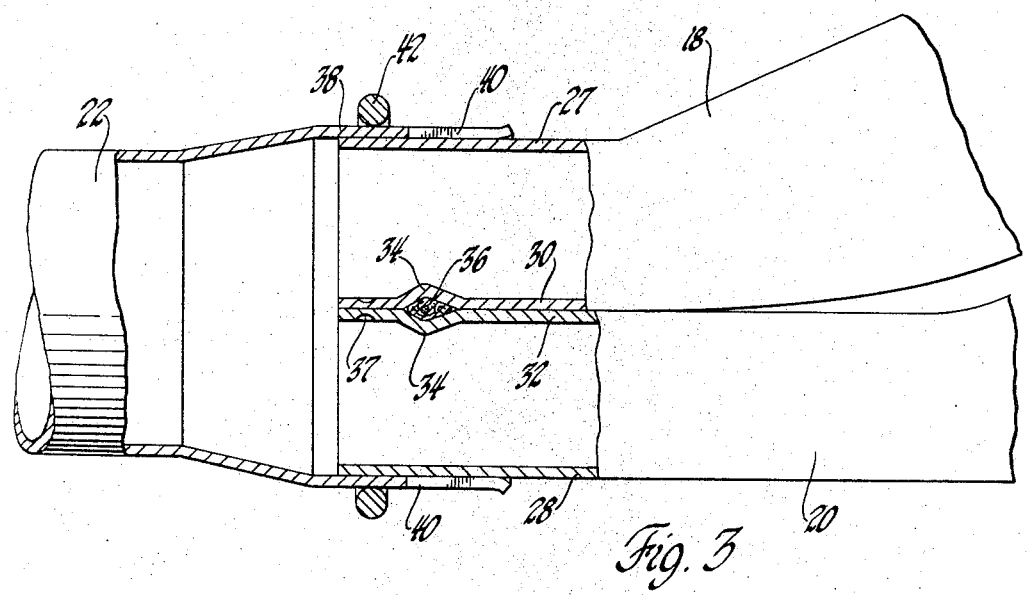
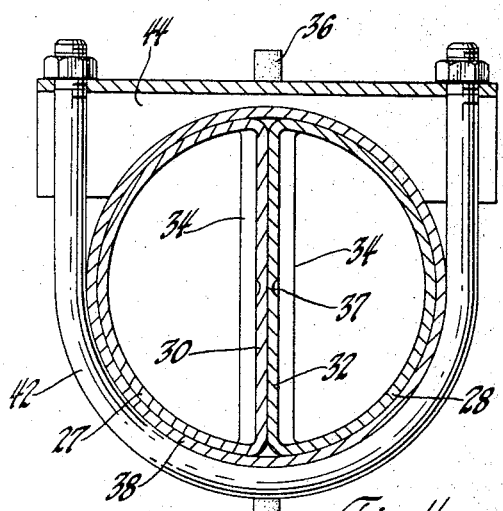
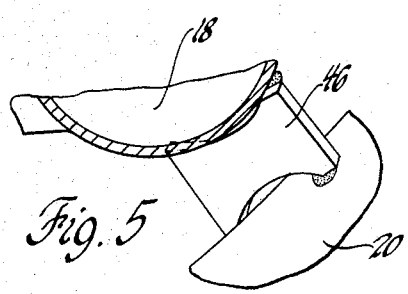
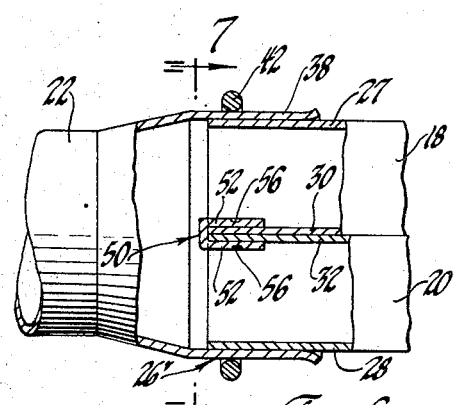
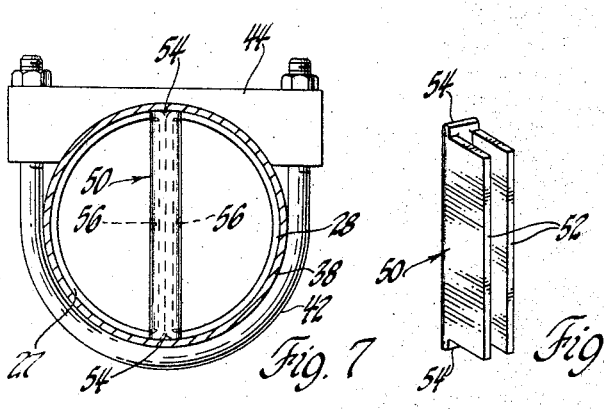
INVENTORS
Thomas R. Cassel, &
BY Harry L. Redding
J. L. Carpenter
ATTORNEY

United States Patent Office 3,336,056
Patented Aug. 15, 1967

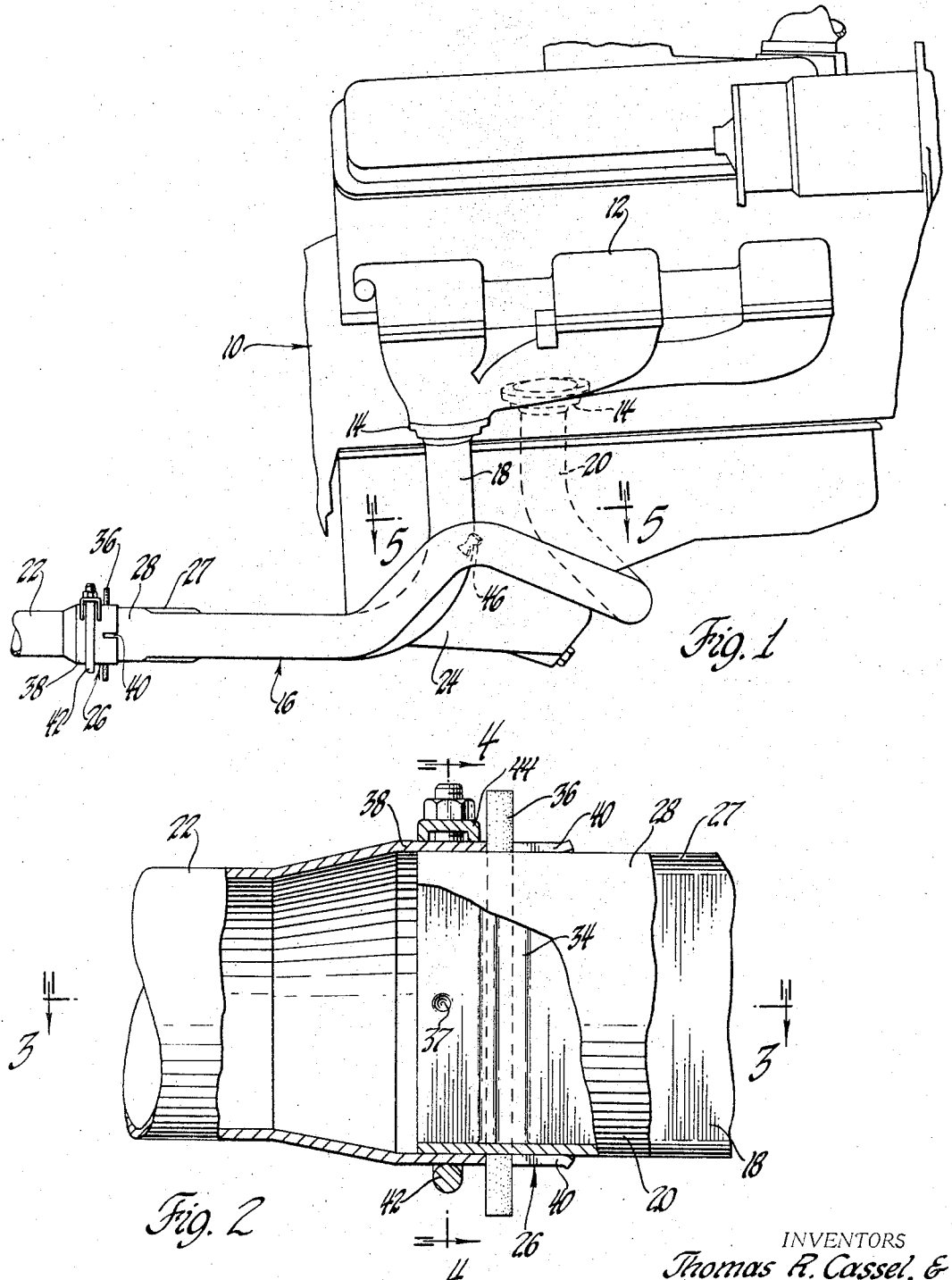

3,336,056
CONDUIT SYSTEM
Thomas R. Cassel, Birmingham, and Harry L. Redding, Pontiac, Mich., assignors to General Motors Corporation, Detroit, Mich., a corporation of Delaware
Filed Mar. 25, 1965, Ser. No. 442,768
8 Claims. (Cl. 285—137)

ABSTRACT OF THE DISCLOSURE

A joint for connecting branch conduits to a main conduit wherein D-shaped ends are formed on the branch conduits and interconnected to form an assembly having an annular outwardly facing surface that is telescopically received within and sealingly engaged by the inner surface of the main conduit end.

---

The connecting means of this invention has many uses and is particularly useful in a motor vehicle exhaust system wherein it is often necessary to connect the branch conduits from the exhaust manifolds to the main exhaust conduit. Generally, the branch conduits are provided with end portions shaped so as to interfit and form an assembly which is received within a complementary shaped end portion of the main conduit. The interfitted end portions of the branch conduits are arranged so that a surface of each branch conduit end portion adjoins a surface of at least one other end portion and sealing means are provided to seal these adjoining surfaces to each other. The branch conduit assembly is also sealed and releasably secured to the main conduit after being received therewithin.

An object of the invention is to provide a connecting means between a plurality of branch conduits and a main conduit which will be highly resistant to leakage.

Another object of the invention is to provide such a connecting means which can be easily and quickly assembled.

These and other objects of the invention will become apparent from the following detailed description of the invention and the accompanying drawings in which:

FIGURE 1 is a side elevational view of portions of an internal combustion engine and exhaust conduit system embodying a connecting means according to this invention;

FIGURE 2 is an enlarged partially broken away view of a portion of FIGURE 1;

FIGURE 3 is a partially broken away view taken generally along the plane indicated by line 3—3 of FIGURE 2;

FIGURE 4 is a sectional view taken generally along the plane indicated by line 4—4 of FIGURE 2;

FIGURE 5 is a view taken generally along the plane indicated by line 5—5 of FIGURE 1;

FIGURE 6 is a plan view to a reduced scale, with certain parts broken away and in section, of a connecting means forming another embodiment of the invention;

FIGURE 7 is a sectional view taken generally along the plane indicated by line 7—7 of FIGURE 6; and FIGURE 8 is a perspective view of the sealing clamp shown in FIGURES 6 and 7.

Referring to the drawings, a conventional engine 10 is provided with exhaust manifolds 12 on opposite sides thereof to receive the discharged products of combustion from the engine cylinders. The manifolds 12 are provided with manifold outlets 14 which are connected to an exhaust or conduit system 16 having branch conduits 18 and 20 and a main conduit 22.

The shorter branch conduit 18 extends downwardly from its respective manifold outlet 14 and then curves rearwardly and extends behind the engine to the forward end of the main conduit 22. The longer branch conduit 20 extends downwardly from its respective manifold outlet 14, passes beneath the engine oil pan 24, and then curves rearwardly extending behind the engine to the forward end of the main conduit 22 and to the rearward end of branch conduit 18.

The adjacent ends of the conduits 18, 20, and 22 are connected together by a connecting means 26, according to this invention, which will now be described.

The rear end portions 27 and 28 of the branch conduits 18 and 20 are shaped to interfit and form an assembly which is receivable in the forward end portion of the main conduit 22. As best shown in FIGURE 4, end portions 27 and 28 are generally D-shaped and have walls 30 and 32 which are arranged back-to-back to form an assembly of generally annular shape. The walls 30 and 32 of the end portions are provided with transverse, juxtaposed grooves 34 which receive a resilient heat resistant gasket 36 to seal the joint between the walls 30 and 32. As shown in FIGURE 2, the end portions of the gasket extend beyond the ends of the grooves 34.

The conduits 18 and 20 are assembled by spotwelding the walls 30 and 32 to each other as at 37. This locates the grooves 34 opposite to each other and also facilitates subsequent handling of the branch conduits. The gasket 36 is inserted in the grooves 34 prior to the conduits being spotwelded together to complete the branch conduit assembly. If desired, securing means other than a spotweld may be used.

The branch conduit assembly is received within the complementary shaped, outwardly flared forward end portion 38 of the main conduit 22. The portion 38 is provided with a plurality of slots 40 which receive the end portions of the gasket 36 in an interference fit to thereby aid in retaining the gasket within the grooves 34. A U-bolt 42 extends around the end portion 38 of the main conduit and is bolted to a saddle member 44 to secure the branch conduit assembly to the main conduit and to also clamp the branch conduit assembly to the main conduit to provide a seal therebetween. If desired, a structural spreader 46 may also be used to interconnect the branch conduits 18 and 20 to make a more rigid assembly in conjunction with the spotweld 37.

In a modification of the above embodiment, the gasket 36 is contained entirely within the grooves 34. In this instance, the gasket 36 is retained within the grooves 34 by the force exerted upon it by the inner walls 30 and 32 of the end portions 27 and 28. The branch conduits 18 and 20 are otherwise assembled and received within the forward end portion 38 of the main conduit 22 in the manner previously described.

A second embodiment of the invention is shown in FIGURES 6 and 7. In this embodiment, the adjacent rear end portions 27 and 28 of the conduits 18 and 20 have been modified by removal of the grooves 34 from the walls 30 and 32. The conduits 18, 20, and 22 are connected together by the connecting means 26′, which is now described.

In lieu of the sealing means of the first embodiment, a sealing clamp 50 is fitted over the edge portions of the walls 30 and 32 to seal the joint therebetween. The sealing clamp 50 is generally U-shaped, having leg portions 52 which extend inwardly and cover the diametrical width of the walls 30 and 32. The leg portions 52 clamp the walls 30 and 32 together to form a tight seal therebetween. In addition, the leg portions 52 act as reinforcing members for the walls 30 and 32 to prevent their possible buckling. When the branch conduit assembly is pressed into a sizing die for final sizing, the end tabs 54 of the sealing clamp 50 are ironed to the outer walls of the assembly to complete the seal. The sealing clamp 50 and the walls 30 and 32 may be spotwelded at 56 to additionally secure these components to each other. If desired, securing means other than a spotweld may be used or this step may be omitted entirely.

The branch conduit assembly is otherwise received within and sealingly secured to the main conduit 22 in the same manner as in the first embodiment. Again, if desired, the structural spreader 46, shown in FIGURE 5, may be used to interconnect the branch conduits 18 and 20 to make a more rigid assembly.

Thus, this invention provides an improved means for connecting a plurality of branch conduits to a main conduit which can be easily and quickly assembled and which provides an excellent seal for the joints formed by such assembly.

What is claimed is:

1. In combination with a main conduit and a plurality of branch conduits, means for connecting said branch conduits to the main conduit, comprising, end portions on said branch conduits shaped to interfit and arranged with respect to each other to form an assembly having an outwardly facing surface, an end portion on said main conduit having an inwardly facing surface telescopically receiving and continuously engaging said outwardly facing surface, each of said end portions on said branch conduits having at least one wall thereto juxtaposed to a wall of at least one other end portion, means fitting over edge portions of said juxtaposed walls clamping said juxtaposed walls to each other and sealing the joint therebetween, and means to sealingly secure the joint between said assembly and said end portion on the main conduit.

2. In combination with a main conduit and a plurality of branch conduits, means for connecting said branch conduits to said main conduit comprising, end portions on said branch conduits shaped to interfit and arranged with respect to each other to form an assembly, said main conduit having an end portion telescopically receiving said assembly, each of said end portions on said branch conduits having at least one wall thereof juxtaposed to a wall of at least one other branch conduit end portion, a generally U-shaped clamping member fitting over edge portions of said juxtaposed walls to clamp said walls to each other and seal the joint therebetween, and means to sealingly secure the joint between said assembly and said end portion on the main conduit.

3. In combination with a main conduit and a plurality of branch conduits, means for connecting said branch conduits to said main conduit comprising, end portions on said branch conduits shaped to interfit and arranged with respect to each other to form an assembly, said main conduit having an end portion telescopically receiving said assembly, each of said end portions on said branch conduits having at least one wall thereof juxtaposed to a wall of at least one other branch conduit end portion, a generally U-shaped clamping member fitting over edge portions of said juxtaposed walls to clamp said walls to each other and seal the joint therebetween, said clamping member having inwardly extending leg portions acting as reinforcing members for said juxtaposed walls, and means to sealingly secure the joint between said assembly and said end portion on the main conduit.

4. The invention according to claim 3 wherein securing means are provided to hold said branch conduits in alignment with each other.

5. In an automotive exhaust system, the combination of a main conduit, a pair of branch conduits, and means for connecting said branch conduits to said main conduit comprising, generally D-shaped end portions on said branch conduits arranged with their flat walls back-to-back to form an assembly of annular shape, a complementary annularly shaped end portion on said main conduit telescopically receiving said assembly, a rigid generally U-shaped clamping member fitting over edge portions of said flat walls to clamp said walls to each other and seal the joint therebetween, said clamping member having inwardly extending leg portions in sealing contact with said flat walls acting as reinforcing members for said walls, and means to sealingly secure the joint between said assembly and said end portion on the main conduit.

6. In combination with a main conduit and a plurality of branch conduits, means for connecting said branch conduits to said main conduit comprising, end portions on the branch conduits shaped to interfit and arranged with respect to each other to form an assembly, said main conduit having an end portion telescopically receiving said assembly and having a plurality of diametrically opposed pairs of slots extending inwardly from the edge thereof, each of said end portions on said branch conduits having at least one surface thereof contiguous to a surface of at least one other branch conduit end portion, said contiguous surfaces having complementary grooves therein, sealing means received within said grooves sealing the joint between said surfaces and having outwardly extending end portions thereon interferingly engaging a pair of said slots, and means to sealingly secure the joint between said assembly and said end portion on the main conduit.

7. The invention according to claim 6 wherein securing means are provided to hold said branch conduits in alignment with each other.

8. In an automotive exhaust system, the combination of a main conduit, a pair of branch conduits, and means for connecting said branch conduits to said main conduit comprising, generally D-shaped end portions on the branch conduits arranged with their flat surfaces back-to-back to form an assembly of annular shape, and having inwardly depressed juxtaposed grooves in said flat surfaces located transverse to the longitudinal axis thereof, a complementary annularly shaped end portion on said main conduit telescopically receiving said assembly and having a plurality of diametrically opposed pairs of slots extending inwardly from the edge thereof, an elongated gasket received within said grooves to seal the joint between said branch conduit end portions and having end portions thereon extending outwardly from said assembly interferingly fitting within a pair of said slots in said end portion on said main conduit, and means to sealingly secure the joint between said assembly and said end portion on the main conduit.

References Cited

UNITED STATES PATENTS

| | | | |
|---|---|---|---|
| 626,447 | 6/1899 | Strater | 285—137 |
| 1,801,091 | 4/1931 | Krauss | 285—155 |
| 2,613,957 | 10/1952 | Ritter | 285—188 |
| 2,786,417 | 3/1957 | Lung | 285—137 X |
| 2,847,819 | 8/1958 | Muller | 285—150 X |

CARL W. TOMLIN, *Primary Examiner.*

EDWARD C. ALLEN, *Examiner.*

D. W. AROLA, *Assistant Examiner.*